United States Patent [19]
Bondley

[11] 3,840,408
[45] Oct. 8, 1974

[54] RECHARGEABLE CELL HAVING CERAMIC-METAL TERMINAL SEAL RESISTANT TO ALKALI ELECTROLYTE

[75] Inventor: Ralph J. Bondley, Scotia, N.Y.

[73] Assignee: General Electric Company, Owensboro, Ky.

[22] Filed: Sept. 20, 1971

[21] Appl. No.: 181,850

[52] U.S. Cl. .............................. 136/133, 136/168
[51] Int. Cl. ........................................ H01m 1/02
[58] Field of Search ....... 136/6, 133, 168, 169, 170; 29/195, 473.1

[56] References Cited
UNITED STATES PATENTS

| | | | |
|---|---|---|---|
| 2,857,663 | 10/1958 | Beggs | 29/473.1 |
| 3,201,278 | 8/1965 | Kurtzweil | 136/133 |
| 3,395,993 | 8/1968 | Bristow | 29/195 |
| 3,421,945 | 1/1969 | Michalko | 136/133 |

Primary Examiner—A. B. Curtis
Assistant Examiner—H. A. Feeley
Attorney, Agent, or Firm—N. J. Cornfeld; D. A. Dearing; F. L. Neuhauser

[57] ABSTRACT

An improved rechargeable cell structure comprises a casing having a nickel-ceramic terminal thereon resistant to alkali electrolyte. the ceramic is a high purity alumina having a low silica content. The metal portions of the terminal are all made of nickel metal. Thus, the nickel parts may be bonded to the ceramic and welded to the casing to avoid introduction of foreign metals into construction of the terminal which may be attacked by the alkali electrolyte. The nickel metal is bonded to the high alumina ceramic by a $TiNi_3$ alloy bond which is formed by a brazing alloy of titanium and nickel between the nickel metal parts and the ceramic parts and heating the assembly to a temperature of about 1,300°C. The resulting terminal does not contain materials that are attacked by the alkali electrolyte and thus a long life seal, that is, a seal which may be expected to last for five to ten years, is possible.

14 Claims, 2 Drawing Figures

PATENTED OCT 8 1974 3,840,408

INVENTOR:
RALPH J. BONDLEY,
BY John P. Taylor
HIS ATTORNEY.

3,840,408

RECHARGEABLE CELL HAVING CERAMIC-METAL TERMINAL SEAL RESISTANT TO ALKALI ELECTROLYTE

BACKGROUND OF THE INVENTION

This invention relates to sealed, rechargeable cells. More particularly, this invention relates to sealed cells having ceramic-to-metal seals therein resistant to alkali electrolyte attack.

Sealed, rechargeable, secondary cells are sometimes used in applications wherein the cell not only is inaccessible for service but replacement of the cell, if it should fail, or begin to leak electrolyte, is impractical if not impossible. Such uses could, for example, include: underwater applications such as remote, unmanned stations; space applications such as satellites; devices implanted within the human body; or other land uses where retrieval and replacement of the device containing the cell is not feasible.

For applications of this kind, many structures, including structures providing ceramic-to-metal seals, have been proposed and built which purport to provide a long life structure capable of preventing electrolyte leakage therefrom for an extending period. However, alkali electrolytes, such as KOH, used in many of these cells have been found to have a deleterious effect on almost all of the materials used to date. In some cases, the ceramic material itself is attacked and in other instances the ceramic-to-metal bond contains materials which do not withstand the attack of an alkali electrolyte or which are subject to electrochemical attack. It is therefore an object of the present invention to provide a structure which will resist the attack of an alkali electrolyte over an extended period of time.

This and other objects of the invention will become apparent from the description and the drawings.

In accordance with the invention, a sealed cell structure is provided which comprises a metal casing and at least one nickel and ceramic terminal assembly wherein the nickel portions of the terminal are insulated from the casing by high alumina ceramic materials having a low silica content which are bonded to the nickel metal portions to form butt seals by a brazing alloy which is predominantly $TiNi_3$ and which is formed by heating the nickel metal and ceramic material, together with the brazing materials, to a temperature of about 1,300°C. The casing contains an alkali electrolyte and the active electrodes which are electrically connected to the respective terminals. The resulting structure comprises a sealed cell wherein the metal and ceramic parts of the terminal are all relatively free or immune from attack by an alkali electrolyte.

DESCRIPTION OF THE PREFERRED EMBODIMENT

Figure 1:
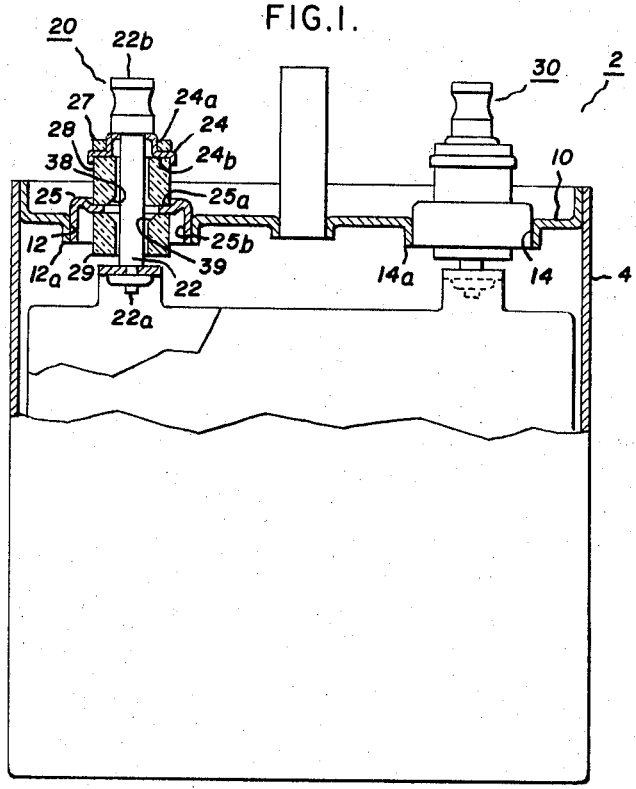
FIG. 1 is a side view of the invention, partially broken away to show the cross-section of the seal structure.

In accordance with the invention, a cell 2 is provided which includes a metal casing 4 which may, for example, comprise a rectangular parallelopiped or a cylinder although the exact shape is not material to the invention. Cell 2 has a top cap 10 which, in the illustrated embodiment, is provided with two terminal members 20 and 30 thereon which provide ingress from the exterior of the cell to the active materials within the cell as will be described in more detail below. Top cap 10 is generally provided with circular openings therein 12 and 14 into which terminal assemblies 20 and 30 are sealed.

Cell 2 contains an alkali electrolyte and active electrode materials which may be in the form of plates such as shown, for example, in U.S. Pat. No. 3,554,805 — Weinstock assigned to the assignee of this invention or in coiled form such as shown in U.S. Pat. No. 3,579,387 — Voyentzie et al, also assigned to the assignee of this invention. The exact shape or arrangement of the electrodes forms no part of the present invention.

As seen more clearly in the cross-sectional view, openings 12 and 14 in top cap or cover 10 comprise downwardly turned circular lips respectively designated as 12a and 14a. Lip 12a provides a surface to which a corresponding nickel lip on terminal assembly 20 can be bonded as by welding or the like.

Terminal assembly 20 is identical to terminal assembly 30 and the detailed description of assembly 20 which follows will serve to describe both of the terminals. Terminal assembly 20 comprises a central nickel terminal rod 22 which electrically communicates with the interior of the cell adjacent one end 22a and has an opposite end on which an enlarged portion 22b is conveniently formed for external connection of the cell terminal with adjacent cells or to a load. Surrounding terminal rod 22 adjacent enlarged portion 22b is a nickel metal sleeve 24 which is formed with an inwardly extending portion 24a, and an outwardly depending sleeve or shoulder 24b. Portion 24a of sleeve 24 is bonded to terminal rod 22 as by welding, or by brazing using a titanium shim, to provide a metal-to-metal bond which will not be attacked by alkali electrolyte.

Another nickel sleeve 25 is provided having an inwardly extending shoulder 25a and an outwardly portion 25b. Portion 25b generally comprises a tubular portion having approximately the same outer diameter as the opening 12 in casing 10. Sleeve 25 is joined to casing 10 by bonding portion 25b thereon to the downwardly extending lip 12a. The preferred bond is again a weld or braze which provides a bonded structure which, as noted above, will withstand an alkali electrolyte.

Terminal rod 22, and the nickel sleeve 24 bonded thereto, are secured in insulated relationship to cover 10 and sleeve 25 by a ceramic washer 28. Washer 28 is generally cylindrical having a central opening therein slightly larger than the diameter of terminal rod 22 to allow passage of the rod therethrough. The end surfaces of washer 28 generally conform to the surfaces of shoulder 25a on sleeve 25 and shoulder 24b on sleeve 24 so that ceramic washer 28 may be butt-sealed to both sleeves.

Ceramic washer 28 preferably comprises high purity alumina characterized by a very low silica content, that is, about 5 percent or less. It is believed that the presence of silica in a ceramic insulator contributes to an attack of the washer or of the bond to the washer by an alkali electrolyte. It is therefore important that the silica content be carefully controlled and minimized. In a preferred embodiment, a 97 percent by weight alumina is used with the balance comprising oxides of Ca, Mg, and Si to provide a ceramic having good mechanical strength and chemical resistance.

In the embodiment illustrated in FIG. 1, two additional ceramic washers 27 and 29 are bonded respectively to sleeves 24 and 25 to provide additional strength. Washer 27 is bonded to the opposite surface of shoulder 24b to reinforce the bond between washer 28 and shoulder 24b while washer 29 is bonded to the opposite surface of shoulder 25a to reinforce the bond between washer 28 and shoulder 25a. It should be noted here that washer 27 is wholly on the outside of terminal 20 and is therefore not in contact with the electrolyte. The low silica requirements previously discussed with respect to washer 28 are therefore not necessarily required for washer 27. Washer 29, on the other hand, should be constructed of the same material as washer 28.

Ceramic washers 27, 28, and 29 are bonded to nickel sleeves 24 and 25 by a titanium-nickel brazing alloy at a temperature around 1,300°C so that the brazing alloy forms a $TiNi_3$ alloy. It has been found that this particular alloy forms a more rugged and durable bond between the ceramic and the nickel than other alloys of titanium and nickel which are formed at lower temperatures. The formation of this bond is described in more detail in Bristow U.S. Pat. No. 3,395,993 and Beggs U.S. Pat. No. 2,857,663, both assigned to the assignee of this invention. In brief, the bond is formed by providing flat parallel surfaces between the ceramic and metal to be bonded together and placing between the surfaces the brazing materials to be used in forming the bond between the ceramic and metal. Since nickel is one of the constituents of the brazing alloy, it is only necessary, in forming the terminals of the invention, to place titanium metal between the ceramic and the nickel sleeve surfaces. The titanium may be in powder form or in the form of a thin shim or washer of, for example, about 0.00025 to 0.001 inch thickness.

Terminal 20 then is formed by placing the materials to be joined together in a furnace. The materials are stacked together by first placing a shim of titanium metal on the upper surface of ceramic washer 29. Nickel sleeve 25 is then placed on top of the shim so that inwardly extending shoulder 25a rests on the shim. A second titanium is then placed on the upper surface or shoulder 25a or sleeve 25 and then ceramic washer 28 is placed thereon. A third titanium shim is placed on the upper surface of washer 28 and nickel sleeve 24 is placed thereon so that the lower surface of shoulder 24b rests on this third shim. A fourth titanium shim is then placed on top of shoulder 24b and ceramic washer 27 placed thereon. The terminal assembly is then heated in a vacuum furnace to a temperature of about 1,300°C and maintained there at this temperature for several minutes. During this time the titanium alloys with the nickel and the resulting molten titanium-nickel alloy reacts with the ceramic. The furnace is then allowed to cool and when it reaches room temperature terminal 20 is removed. The entire heating and cooling cycle comprises about 1 hour. Terminal 20 may then be bonded to cover 10 by welding portion 25b of nickel sleeve 25 to the downwardly turned portion 12a on cover 10.

It should be noted that both ceramic washers 28 and 29 are formed with a beveled inner edge respectively denoted at 38 and 39. These bevels serve to inhibit flow of the brazing alloy between the two washers adjacent rod 22. While, as stated earlier, rod 22 is smaller in diameter than the central openings in the ceramic washers, flow of the brazing alloy up to the edge of the opening could result in undesirable contact and resultant shorting between the alloy and rod 22. Bevels 38 and 39 inhibit the flow of the alloy adjacent rod 22 and thus prevent such contact.

Terminal 30 is constructed in similar fashion and, after both terminals have been mounted into cover 10 and the internal plates of the cell have been fastened in appropriate relationship to the terminals, an upwardly turned edge 10a of cover 10 is bonded to casing 4 by an appropriate weld or braze.

Casing 4 is constructed of an electrolyte-resistant metal such as, for example, nickel or stainless steel. In the illustrated embodiment, two terminals are used respectively for the negative and positive electrodes within the cell and thus the casing is not electrically connected to the electrochemically active portions of the cell. It has been found that the use of other brazing metals such as Ni-Au can, therefore, be used to join cover 10 to casing 4. However, if casing 4 is to function as one of the terminals of the cell, the use of other brazing materials in the joining of cover 10 to casing 2 is not advisable because of the problems of electrolyte attack previously discussed. Apparently, this is because the attack is not purely chemical but at least partially electrochemically induced when the metallic portions in question form an electrical part of the cell. In any event, the use of a brazing metal which may migrate, such as silver, is to be avoided.

Figure 2:
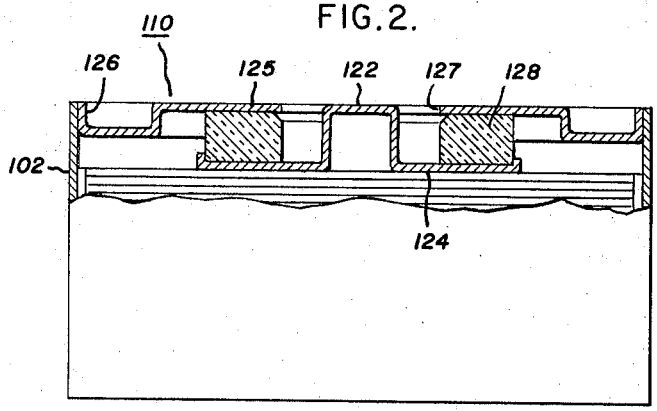
FIG. 2 is a fragmentary, cross-sectional view of another embodiment.

Turning now to FIG. 2, an alternatie construction is illustrated wherein a casing 102 which, in the illustrated embodiment is cylindrical, is fitted with a cover and terminal assembly 110.

Assembly 110 comprises a central, nickel metal terminal member 122 comprising a generally cup-shaped member having an outer flange 124 and a circular disc 125 which is provided with an outer flange 126 and a central bore 127. A ceramic washer 128 is bonded on one side to flange 124 and on the other side to disc 125. It should be noted that the additional, back-up ceramics have been omitted in this embodiment. The primary purpose of the additional ceramic washers in FIG. 1 is to impart additional mechanical strength to the metal-to-ceramic bond. The particular configuration of the terminal or the intended application may make the use of such additional ceramics unnecessary.

The bonds between ceramic washer 128 and nickel members 124 and 125 are formed using titanium metal as previously described with respect to FIG. 1. In the particular embodiment illustrated in FIG. 2, which is intended as a power source for an implantable electronic device such as a heart stimulator, only one terminal assembly is used, casing 102 serving as the other terminal.

In both of the foregoing constructions it should be noted that substantially the only materials used in constructing the terminal which will be contacted by the electrolyte comprise nickel; the high purity alumina having a low silica content; and the $TiNi_3$ braze. Previous testing of these materials independently indicates that each has a substantial resistance to attack by an alkali electrolyte such as potassium hydroxide.

To perform tests necessary to demonstrate that the actual cells made using the construction of the invention would perform without leakage or failure due to electrolyte attack of the seal, a number of cells were constructed using the casing structure of the invention as illustrated in FIG. 1. 45 6 ampere hour cells were constructed in accordance with the invention. 40 of these cells were constructed generally as illustrated in FIG. 1. Five additional cells were constructed identical to the foregoing cells with the addition of a pressure gauge attached to cell cover 10 at a point between the terminals to determine any changes in pressure within the cell during a life period. The cells were tested to determine initially electrolyte leakage, internal shorts, low capacity, or inability of any cell to recover open circuit voltage above 1.150 volts after the cell short test. None of the cells tested under the acceptance tests showed any signs of leakage.

Subsequent to the initial tests, 40 cells were selected for life evaluation and placed on a life cycling test. After 8 months of life cycling, none of the cells have shown any sign of leakage indicating that the construction of the invention appears to have finally achieved a sealed structure for a casing which is relatively impervious to attack by alkali electrolyte.

The invention therefore provides a cell structure for a long life, sealed, secondary cell using alkali electrolyte whereby the metal and ceramic materials and the bonding materials used to join the foregoing together are selected to provide not only a mechanically stable structure but a structure which is relatively inert to chemical attach by the alkali electrolyte contained within the cell. The invention thus provides a cell capable of containing an alkali electrolyte without leakage over an extended period of time without maintenance of the cell.

What is claimed is:

1. A sealed, rechargeable cell structure for an alkali-electrolyte cell containing positive and negative electrodes therein comprising an alkali-resistant metal casing having an alkali-resistant cover bonded thereto, terminal means carried by said cover and electrically communicating therethrough with at least one of said electrodes, said terminal means comprising a terminal rod member defining an axis, a first nickel sleeve coaxial with and spaced from said rod member and having an inwardly extending shoulder formed thereon and an outer portion bonded to said cover, cylindrical ceramic washer means coaxial with said rod member and comprising high-purity alumina having one end thereof bonded to said shoulder with a ceramic-to-metal bonding agent, a second nickel sleeve coaxial with and sealed to said rod member and having an outwardly formed shoulder thereof bonded to the opposite end of said ceramic washer with an alkali-resistant ceramic-to-metal bonding agent to form parallel, axially spaced apart, butt seals on both ends of said cylindrical ceramic washer, said second sleeve being electrically coupled to one of said electrodes within said cell.

2. The cell structure of claim 1 wherein a second cylindrical ceramic washer is bonded to the opposite side of said shoulder of said first nickel sleeve and a third cylindrical ceramic washer is bonded to the opposite side of said shoulder on said second nickel sleeve, said additional ceramic washers strengthening the bonds of said nickel sleeves to said first cylindrical ceramic washer.

3. The cell structure of claim 1 wherein said terminal rod member passes freely through a central opening in said ceramic washer to communicate with the interior of said cell.

4. The cell structure of claim 3 wherein portions of said washer adjacent said rod are cutaway to inhibit contact by said bonding agent with said rod.

5. An improved sealed cell structure for a rechargeable cell containing active electrodes and an alkali electrolyte comprising an alkali-resistant metal casing; an alkali-resistant cover bonded to said cover, said cover having an opening therein; and sealed terminal means sealing said opening, communicating with at least one of said electrodes therein and comprising an axially stacked array of metal sleeves and ceramic cylindrical washers bonded together with a bonding agent consisting essentially of a predominantly $TiNi_3$ alloy, said array of sleeves and washers including first and second nickel metal sleeves having a high-purity alumina ceramic washer therebetween to insulate said first and second metal sleeves from one another, said first metal sleeve bonded and electrically connected to said casing and said second metal sleeve electrically connected to one of said electrodes, said first metal sleeve being in a spaced, non-conductive relationship with said one electrode.

6. The cell structure of claim 5 wherein said metal and ceramic washers form substantially spaced parallel butt seals.

7. The cell structure of claim 6 wherein said casing is constructed of an alkali resistant metal selected from the class consisting of nickel and stainless steel.

8. The cell structure of claim 5 wherein said electrodes comprise negative and positive electrodes and each electrode is connected to terminal means on said cover.

9. The cell structure of claim 5 wherein said high purity alumina comprising from 95–97 percent alumina and is further characterized by a low silica content to improve the resistant of the ceramic to an alkali electrolyte.

10. An improved sealed cell structure for a rechargeable cell containing active electrodes and an alkali electrolyte comprising an alkali-resistant metal casing having a cover of alkali-resistant metal thereon, said alkali-resistant metal being selected from the class consisting of nickel and stainless steel, said cover having an opening therein and having terminal means thereon sealing said opening formed by:

a. brazing together an axially stacked array of nickel sleeves, each said sleeve having a substantially planar portion, said planar portions being substantially parallel to each other, and at least one high purity alumina washer with titanium metal interposed between said planar portions at a temperature of about 1300°C to form ceramic-to-metal butt seals consisting essentially of a predominantly $TiNi_3$ alloy, b. electrically connecting one of said metal sleeves to one of said electrodes, and c. bonding another of said metal sleeves to said cover in a spaced non-conductive relationship with said one electrode.

11. An electrochemical device having a casing containing an electrolyte and active electrode elements immersed in said electrolyte; and a cover and terminal assembly, said assembly comprising a conductive terminal of inverted cup-shaped configuration including a bright portion and free end portions depending therefrom, the free end portions of said terminal being provided with outwardly extending flange portions which are connected to one of said active elements; an apertured conductive closure coaxially disposed about said terminal member, portions of said closure being arranged in spaced, partly overlapping relation to said flange portions, other portions of said closure being connected to said casing, an annular ceramic washer coaxial with said terminal, the inner wall of said washer spaced from said free end portions, a bonding agent consisting essentially of a predominantly $TiNi_3$ alloy on one face of said washer bonding said washer to said overlapping portion of said closure, said bonding agent on another face of said washer bonding said washer to said flange portion of said terminal, said washer being supported only between said overlapping portions of said closure and said flange portion in substantially radial compression-free relationship.

12. The device as defined in claim 11 wherein said bight portion comprises a substantially planar disc, and said overlapping closure portions are substantially coplanar with and electrically isolated from said bight portion.

13. The device as defined in claim 11 wherein said terminal is formed of a material selected from the class comprising nickel and stainless steel, and said ceramic washer is of a high-alumina ceramic material having low silica content, the ceramic-to-metal bond being effected at a temperature ranging between 1,250°C and 1,350°C.

14. A cover and terminal assembly for an electrochemical device having a casing containing an electrolyte and active electrode elements immersed in said electrolyte; said assembly comprising a conductive terminal of inverted cup-shaped configuration including free end portions depending therefrom, the free end portions of said terminal being provided with outwardly extending flange portions which are adapted to be connected to one of said active elements; an apertured conductive closure coaxially disposed about said terminal member, portions of said closure being arranged in spaced, partly overlapping relation to said flange portions, other portions of said closure being adapted for connection to said casing, an annular ceramic washer coaxial with said terminal, the inner wall of said washer being spaced from said free end portions, one face of said washer bonded to said overlapping portion of said closure, another face of said washer bonded to said flange portion of said terminal, the ceramic-to-metal bonds consisting essentially of a predominantly $TiNi_3$ alloy formed at a temperature ranging between 1,250°C and 1,350°C, said washer being supported only between said overlapping portions of said closure and said flange portion in substantially radial compression-free relationship.

* * * * *

UNITED STATES PATENT OFFICE
CERTIFICATE OF CORRECTION

Patent No. 3,840,408      Dated October 8, 1974

Inventor(s) Ralph J. Bondley

It is certified that error appears in the above-identified patent and that said Letters Patent are hereby corrected as shown below:

Cancel Claims 1 through 4.

Claim 11, Column 6, Line 67, cancel "bright" and insert -- bight --.

Signed and sealed this 15th day of April 1975.

(SEAL)
Attest:

RUTH C. MASON
Attesting Officer

C. MARSHALL DANN
Commissioner of Patents
and Trademarks